US012566614B2

(12) United States Patent
Chan et al.

(10) Patent No.: US 12,566,614 B2
(45) Date of Patent: Mar. 3, 2026

(54) IP HARDENED UNIVERSAL DEVICE IDENTIFIER

(71) Applicant: MASTERCARD TECHNOLOGIES CANADA ULC, Vancouver (CA)

(72) Inventors: Sik Suen Chan, Richmond (CA); Igor Opushnyev, New Westminster (CA); Nikolay Shenkov, Burnaby (CA); Christina Bowman, Surrey (CA)

(73) Assignee: MASTERCARD TECHNOLOGIES CANADA ULC, Vancouver (CA)

( * ) Notice: Subject to any disclaimer, the term of this patent is extended or adjusted under 35 U.S.C. 154(b) by 262 days.

(21) Appl. No.: 18/541,288

(22) Filed: Dec. 15, 2023

(65) Prior Publication Data

US 2024/0202007 A1      Jun. 20, 2024

Related U.S. Application Data

(60) Provisional application No. 63/514,733, filed on Jul. 20, 2023, provisional application No. 63/387,868, filed on Dec. 16, 2022.

(51) Int. Cl.
*G06F 9/4401* (2018.01)

(52) U.S. Cl.
CPC ................................. *G06F 9/4416* (2013.01)

(58) Field of Classification Search
CPC ................................................... G06F 9/4416
See application file for complete search history.

(56) References Cited

U.S. PATENT DOCUMENTS

| | | |
|---|---|---|
| 2021/0044578 A1 | 2/2021 | Chan et al. |
| 2022/0100834 A1 | 3/2022 | Chan et al. |
| 2022/0156170 A1* | 5/2022 | Opushnyev ............. H04L 67/54 |

OTHER PUBLICATIONS

International Search Report and Written Opinion for Application No. PCT/CA2023-051665 dated Mar. 28, 2024 (9 pages).

* cited by examiner

*Primary Examiner* — Minh Chau Nguyen
(74) *Attorney, Agent, or Firm* — Michael Best & Friedrich LLP

(57) ABSTRACT

Embodiments herein provide a server including a memory and an electronic processor. The server includes a UDID database. The electronic processor is configured to receive an identification request regarding a currently-observed user device having a first set of attributes associated with the currently-observed user device. The first set of attributes includes an IP address of the currently-observed user device. The electronic processor is further configured to generate an IP hardened UDID associated with the currently-observed user device based on the first set of attributes, and store the IP hardened UDID in the UDID database. The generation of the IP hardened UDID compensates for changes in the IP address of the currently-observed user device over a period of time.

20 Claims, 6 Drawing Sheets

600

600

IP HARDENED UNIVERSAL DEVICE IDENTIFIER

RELATED APPLICATIONS

This application claims the benefit of U.S. Provisional Patent Application No. 63/387,868, filed Dec. 16, 2022, and U.S. Provisional Patent Application No. 63/514,733, filed Jul. 20, 2023, the entire contents of which is hereby incorporated by reference.

BACKGROUND

The present disclosure relates generally to device identification. More specifically, the present disclosure relates to device identification using a universal device identifier service with device attributes.

SUMMARY

Conventionally, device identification is addressed using an account identifier (ID) associated with the device or an internet protocol (IP) address of the device. Device identification is made difficult when the IP address of the device changes, when an account ID changes in new-user flow, or when account ID or IP address information is otherwise not available.

The disclosure provides, in one embodiment, a server including a memory and an electronic processor. The memory includes a UDID database. The electronic processor is configured to receive an identification request regarding a currently-observed user device having a first set of attributes associated with the currently-observed user device. The first set of attributes include an IP address of the currently-observed user device. The electronic processor is also configured to generate an IP hardened UDID associated with the currently-observed user device based on the first set of attributes, and store the IP hardened UDID in the UDID database. The IP hardened UDID compensates for changes in the IP address of the currently-observed user device over a period of time.

In some aspects, the UDID database stores a plurality of device records, each respective device record of the plurality of device records is associated with a previously-observed user device, the each respective device record includes a second set of attributes and a UDID associated with the each respective device record, and the electronic processor is configured to generate the IP hardened UDID by selecting a set of candidate device records from the plurality of device records based on the first set of attributes.

In some aspects, the electronic processor is further configured to generate the IP hardened UDID by determining whether the set of candidate device records includes at least one device record, in response to determining that the set of candidate device records does not include the at least one device record, generating a new device record including the first set of attributes, generating a new UDID associated with the new device record as the IP hardened UDID, storing the new device record in the UDID database, and returning the new UDID associated with the new device record as a response to the identification request.

In some aspects, the electronic processor is further configured to generate the IP hardened UDID by determining whether the set of candidate device records includes at least one device record, in response to determining that the set of candidate device records includes the at least one device record, selecting one of the at least one device record included in the set of candidate device records, determining whether a total relevance score associated with the selected one of the at least one device record exceeds a threshold score, in response to determining that the total relevance score associated with the selected one of the at least one device record exceeds the threshold score, selecting the UDID associated with the selected one of the at least one device record as the IP hardened UDID, and returning the UDID associated with the selected one of the at least one device record as a response to the identification request.

In some aspects, the electronic processor is further configured to modify, in the UDID database, the second set of attributes included in the selected one of the at least one device record based on the first set of attributes.

In some aspects, the electronic processor is further configured to generate the IP hardened UDID by in response to determining that the total relevance score associated with the selected one of the at least one device record does not exceed the threshold score, generating a new device record including the first set of attributes, generating a new UDID associated with the new device record as the IP hardened UDID, and storing the new device record in the UDID database.

In some aspects, the electronic processor is configured to select one of the at least one device record included in the set of candidate device records by computing the total relevance score for the each respective device record included in the set of candidate device records, and selecting a device record from the set of candidate device records having a highest total relevance score.

In some aspects, the electronic processor is configured to compute the total relevance score for the each respective device record included in the set of candidate device records by for each attribute included in the second set of attributes of the each respective device record that is equal to an attribute included in the first set of attributes, computing an individual relevance score, and computing a sum of each individual relevance score for the each respective device record.

In some aspects, the electronic processor is configured to compute the individual relevance score based on at least one selected from a group consisting of: a key of the attribute, a term of the attribute, an entropy of the attribute, and a rarity of the attribute.

The disclosure also provides a server including a memory and an electronic processor. The memory includes a UDID database. The electronic processor is configured to receive an identification request regarding a currently-observed user device having a first set of attributes associated with the currently-observed user device. The first set of attributes include an IP address of the currently-observed user device. The electronic processor is also configured to generate an IP hardened UDID associated with the currently-observed user device based on the first set of attributes, and store the IP hardened UDID in the UDID database. The IP hardened UDID compensates for an absence in the IP address of the IP address in the first set of attributes.

The disclosure also provides a method for UDID generation. The method includes receiving, with an electronic processor, an identification request regarding a currently-observed user device having a first set of attributes associated with the currently-observed user device. The first set of attributes include an IP address of the currently-observed user device. The method also includes generating, with the electronic processor, an IP hardened UDID associated with the currently-observed user device based on the first set of attributes. The method further includes storing, with the electronic processor, the IP hardened UDID in a UDID database. The IP hardened UDID compensates for at least one selected from the group consisting of: changes in the IP address of the currently-observed user device over a period of time, and an absence of the IP address in the first set of attributes.

In some aspects, the UDID database stores a plurality of device records, each respective device record of the plurality of device records is associated with a previously-observed user device, the each respective device record includes a second set of attributes and a UDID associated with the each respective device record, and generating the IP hardened UDID includes selecting a set of candidate device records from the plurality of device records based on the first set of attributes.

In some aspects, generating the IP hardened UDID includes determining whether the set of candidate device records includes at least one device record, in response to determining that the set of candidate device records does not include the at least one device record, generating a new device record including the first set of attributes, generating a new UDID associated with the new device record as the IP hardened UDID, storing the new device record in the UDID database, and returning the new UDID associated with the new device record as a response to the identification request.

In some aspects, generating the IP hardened UDID includes determining whether the set of candidate device records includes at least one device record, in response to determining that the set of candidate device records includes the at least one device record, selecting one of the at least one device record included in the set of candidate device records, determining whether a total relevance score associated with the selected one of the at least one device record exceeds a threshold score, in response to determining that the total relevance score associated with the selected one of the at least one device record exceeds the threshold score, selecting the UDID associated with the selected one of the at least one device record as the IP hardened UDID, and returning the UDID associated with the selected one of the at least one device record as a response to the identification request.

In some aspects, the method further includes modifying, in the UDID database with the electronic processor, the second set of attributes included in the selected one of the at least one device record based on the first set of attributes.

In some aspects, generating the IP hardened UDID includes in response to determining that the total relevance score associated with the selected one of the at least one device record does not exceed the threshold score, generating a new device record including the first set of attributes, generating a new UDID associated with the new device record as the IP hardened UDID, and storing the new device record in the UDID database.

In some aspects, selecting one of the at least one device record included in the set of candidate device records includes computing the total relevance score for the each respective device record included in the set of candidate device records, and selecting a device record from the set of candidate device records having a highest total relevance score.

In some aspects, computing the total relevance score for the each respective device record included in the set of candidate device records includes for each attribute included in the second set of attributes of the each respective device record that is equal to an attribute included in the first set of attributes, computing an individual relevance score, and computing a sum of each individual relevance score for the each respective device record.

In some aspects, the individual relevance score is computed based on at least one selected from a group consisting of: a key of the attribute, a term of the attribute, an entropy of the attribute, and a rarity of the attribute.

DETAILED DESCRIPTION

Identification of a user device (e.g., a user device attempting to log into a secure web service) is typically addressed using an account identifier (account ID) associated with the user device or an internet protocol (IP) address of the user device. A universal device identifier (UDID) may be assigned to the device based on the account ID associated with the device, the IP address associated with the device, or both. However, the IP address of some devices, such as mobile devices, may change frequently. Additionally, an account ID associated with the user device may change, for example, when a new user creates an account using the user device. Therefore, embodiments described herein relate to an internet protocol (IP) hardened universal device identifier (also referred to as "IP hardened UDID service") for a system, and environments and systems utilizing this service. The IP hardened UDID service analyzes device attributes of a user device, evaluating numerous device attributes of a currently-observed user device. These device attributes capture a variety of distinctive markers that may be used to assign a universal device identifier (UDID) to the use device. While the UDID service is described herein as an "IP hardened UDID service," the UDID service may alternatively be described as a "flexible UDID service," where the UDID may be generated from device attributes that include, or do not include, an IP address.

Figure 1:
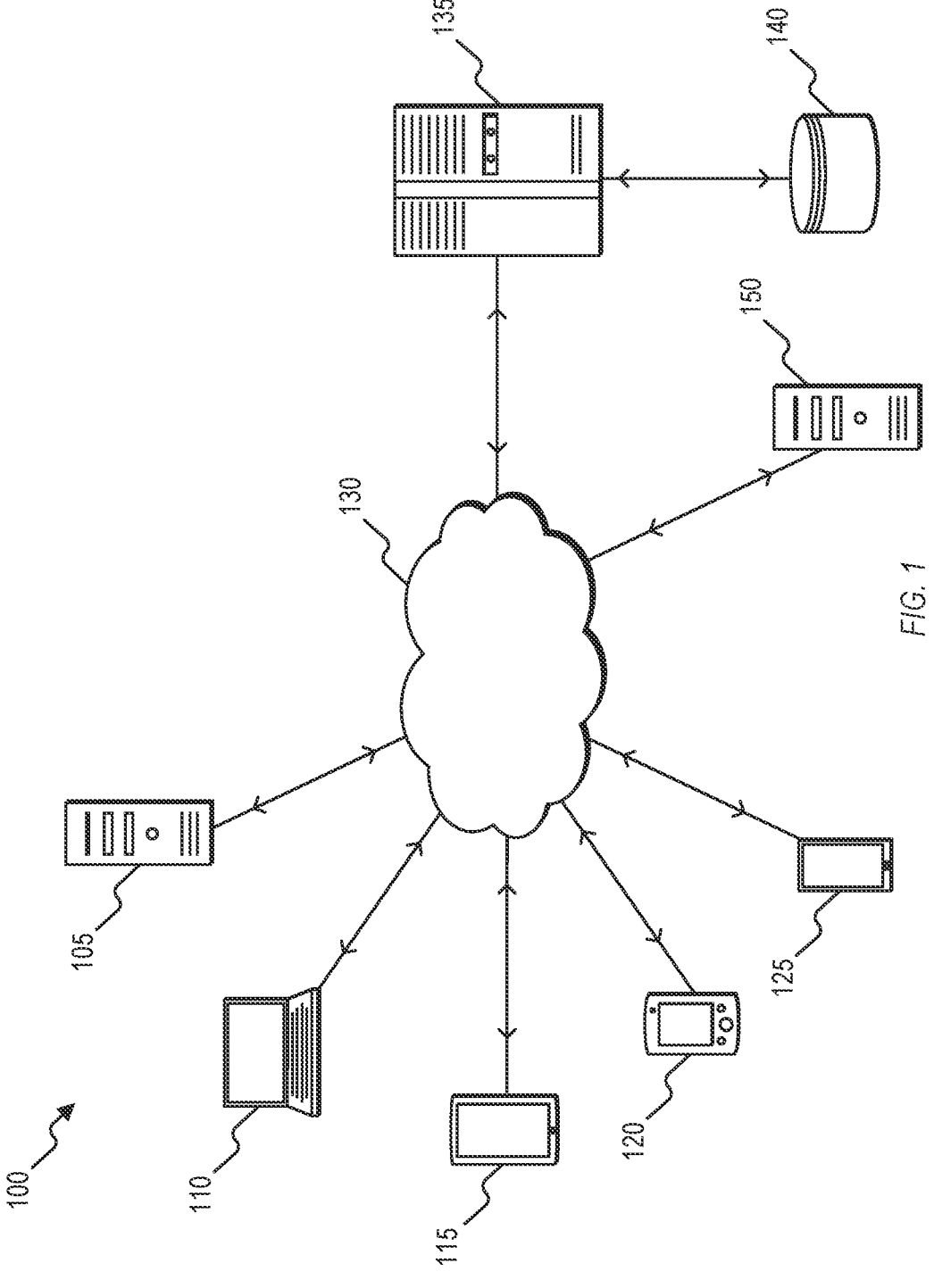
FIG. 1 is a diagram that illustrates a system for a Universal Device Identifier service that evaluates a user's device, according to some embodiments described herein.

FIG. 1 illustrates a system 100 for an IP hardened UDID service that evaluates a user's device, according to embodiments described herein. The system 100 includes a plurality of user devices 105-125, a network 130, a server 135, a database 140, and a client server 150. The plurality of user devices 105-125 include, for example, a personal, desktop computer 105, a laptop computer 110, a tablet computer 115, a personal digital assistant ("PDA") (e.g., an e-reader, etc.) 120, and a mobile phone (e.g., a smart phone) 125. Each of the user devices 105-125 is configured to communicatively connect to the server 135 through the network 130 and provide information to the server 135 related to attributes or values for attributes of the user devices 105-125. Device attributes of the user devices 105-125 are key-value pairs that include a type of attribute as a key (e.g., a device language) and a corresponding value (e.g., English-US). The attribute key may alternatively be referred to herein as a "field." The attribute value may alternatively be referred to herein as a "term."

The database 140 stores a plurality of device records associated with previously-observed user devices. Each device record in the plurality of device records includes a set of attributes associated with the previously-observed user device, a UDID associated with the previously-observed user device, and a time stamp associated with a most recent observation of the previously-observed user device. Each of the plurality of device records may be partitioned into one of a plurality of searchable indexes based on a device type associated with each of the plurality of device records (as described in greater detail below with respect to FIG. 3).

The network 130 is, for example, a wide area network ("WAN") (e.g., a TCP/IP based network), a local area network ("LAN"), a neighborhood area network ("NAN"), a home area network ("HAN"), or personal area network ("PAN") employing any of a variety of communications protocols, such as Wi-Fi, Bluetooth, ZigBee, etc. In some implementations, the network 130 is a cellular network, such as, for example, a Global System for Mobile Communications ("GSM") network, a General Packet Radio Service ("GPRS") network, a Code Division Multiple Access ("CDMA") network, an Evolution-Data Optimized ("EV-DO") network, an Enhanced Data Rates for GSM Evolution ("EDGE") network, a 3GSM network, a 4GSM network, a 4G LTE network, a Digital Enhanced Cordless Telecommunications ("DECT") network, a Digital AMPS ("IS-136/TDMA") network, or an Integrated Digital Enhanced Network ("iDEN") network, etc.

The connections between the user devices 105-125 and the network 130 are, for example, wired connections, wireless connections, or a combination of wireless and wired connections. The connection between the server 135 and the network 130 is a wired connection, wireless connection, or a combination of wireless and wired connections. The connection between the client server 150 and the network 130 is a wired connection, wireless connection, or a combination of wireless and wired connections.

The client server 150 is a server of a resource provider. For example, the client server 150 is a bank server that provides access to a credit card online account to a user of the credit card online account. However, any server-side resource may be considered in place of the "credit card online account."

Figure 2:
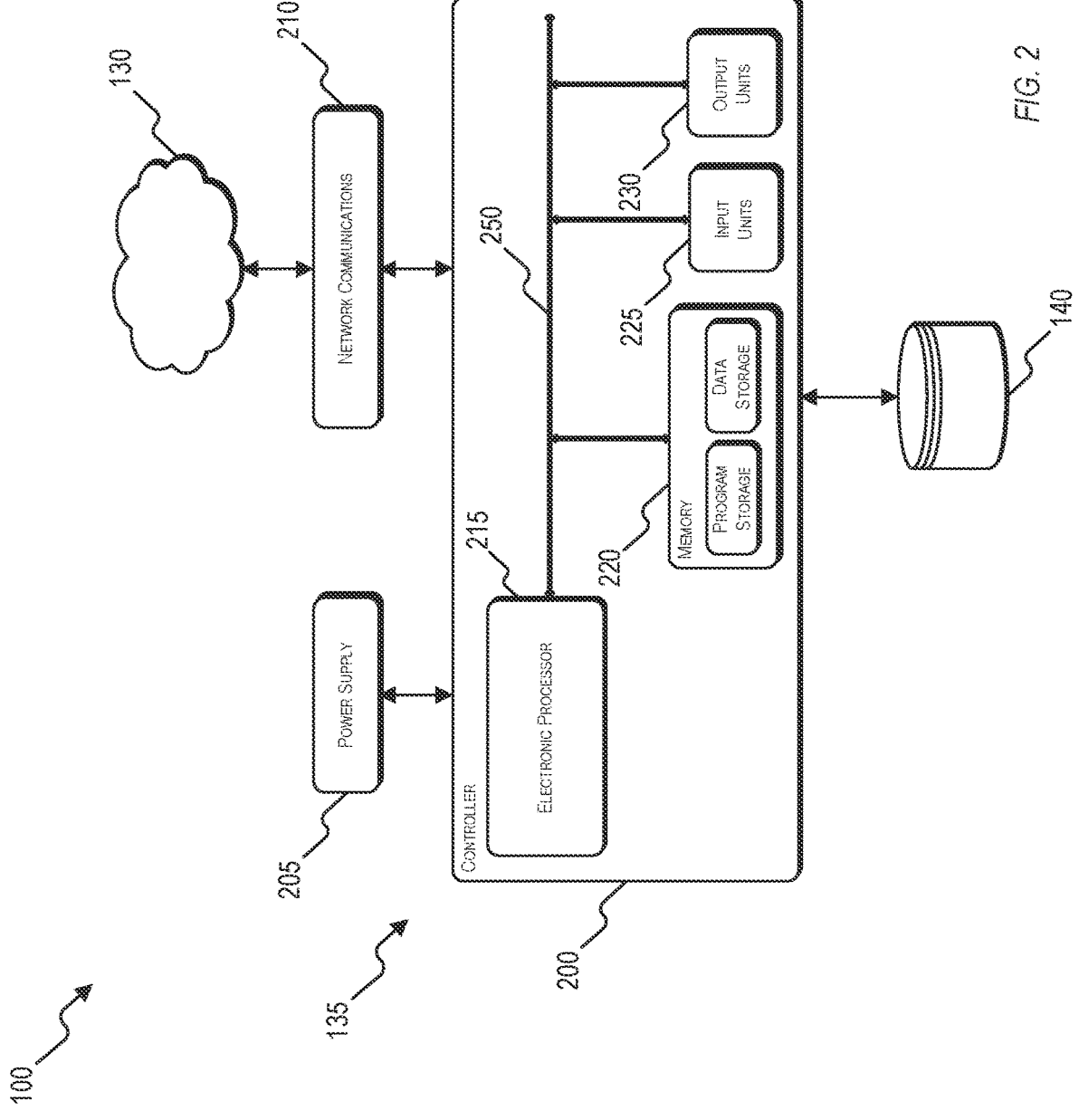
FIG. 2 is a block diagram that illustrates the server of the system of FIG. 1, according to some embodiments described herein.

FIG. 2 is a block diagram that illustrates the server 135 of the system 100 of FIG. 1. The server 135 is electrically and/or communicatively connected to a variety of modules or components of the system 100. For example, the illustrated server 135 is connected to the database 140. The server 135 includes a controller 200, a power supply module 205, and a network communications module 210.

The controller 200 includes combinations of hardware and software that are configured to, for example, provide the IP hardened UDID service to evaluate the device attributes of the devices 105-125. For example, the IP hardened UDID service may evaluate the device attributes of the devices 105-125 while the users are attempting to access a server-side resource (e.g., respective online accounts). The controller 200 includes a plurality of electrical and electronic components that provide power, operational control, and protection to the components and modules within the controller 200 and/or the system 100. For example, the controller 200 includes, among other things, an electronic processor 215 (e.g., a microprocessor, a microcontroller, or other suitable processing device), a memory 220, input units 225, and output units 230.

The electronic processor 215, the memory 220, the input units 225, and the output units 230, as well as the various modules connected to the controller 200 are connected by one or more control and/or data buses (e.g., common bus 250). The control and/or data buses are shown schematically in FIG. 2 for illustrative purposes.

The memory 220 is a non-transitory computer-readable medium and includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, electronic memory devices, or other data structures. In some examples, the program storage area may store the instructions regarding the IP hardened UDID service program (referred to herein as "IP hardened UDID service") as described in greater detail below.

The electronic processor 215 executes machine-readable instructions stored in the memory 220. For example, the electronic processor 215 may execute instructions stored in the memory 220 to perform the functionality of the IP hardened UDID service as described below.

In some embodiments, the controller 200 or network communications module 210 includes one or more communications ports (e.g., Ethernet, serial advanced technology attachment ["SATA"], universal serial bus ["USB"], integrated drive electronics ["IDE"], etc.) for transferring, receiving, or storing data associated with the system 100 or the operation of the system 100. Software included in the implementation of the system 100 can be stored in the memory 220 of the controller 200. The software includes, for example, firmware, one or more applications, program data, filters, rules, one or more program modules, and other executable instructions. The controller 200 is configured to retrieve from memory and execute, among other things, instructions related to the IP hardened UDID service described herein.

The power supply module 205 supplies a nominal AC or DC voltage to the controller 200 or other components or modules of the system 100. The power supply module 205 is powered by, for example, mains power having nominal line voltages between 100V and 240V AC and frequencies of approximately 50-60 Hz. The power supply module 205 is also configured to supply lower voltages to operate circuits and components within the controller 200 or system 100.

The server 135 is configured to perform the IP hardened UDID service to evaluate the attributes of a user device in order to assign a previously recorded UDID to the device, assign a new UDID to the device, or assign a default UDID to the device based on the attributes of the device.

Figure 3:
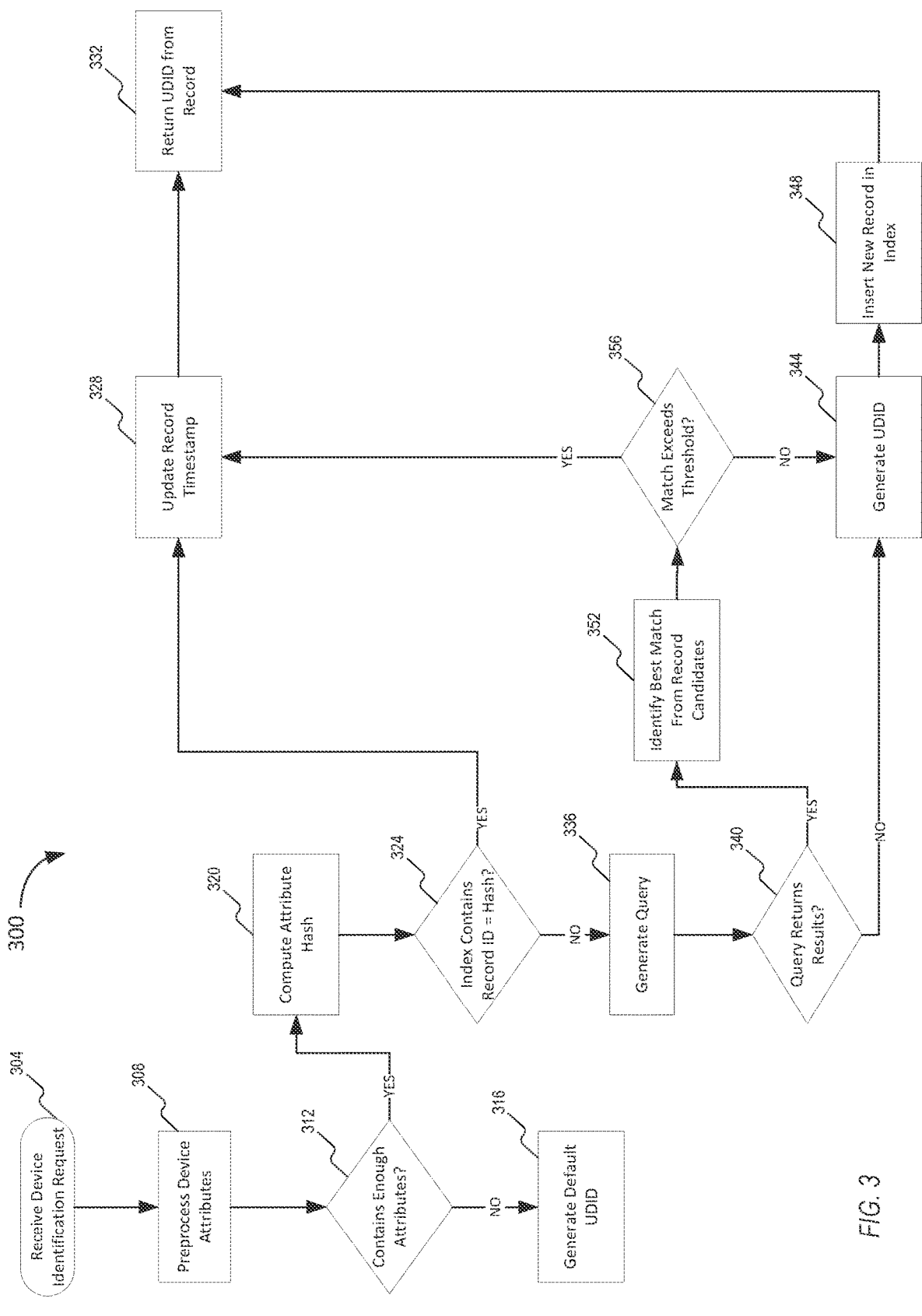
FIG. 3 illustrates a first example method for generating a Universal Device Identifier for a user device, according to some embodiments described herein.

FIG. 3 is a flowchart that illustrates a first example method 300 executed by the server 135 for generating an IP hardened UDID for a currently-observed user device, according to some embodiments. The method 300 is described with respect to the server 135 of FIGS. 1 and 2.

The method 300 includes the server 135 receiving an identification request for a user device with device attributes (at block 304). For example, the server 135 receives an identification request from a computing device regarding a currently-observed user device with a first set of attributes. In some instances, the first set of attributes includes, for example, at least one selected from the group including an operating system (OS) family, an OS version, a web browser family, a web browser family, an indication (e.g., a Boolean value) of whether cookies are enabled, an indication (e.g., a Boolean value) of whether local storage is enabled, a time zone, a language, one or more constants associated with a graphics application programming interface (API) (e.g., Canvas, WebGL, etc.), a device ID, an account ID, a screen resolution, a color depth, and an operating system platform. The first set of attributes may include other suitable device attribute information regarding the user device.

The method 300 includes the server 135 preprocessing the first set of attributes (at block 308). Preprocessing the first set of attributes includes, for example, parsing the first set of attributes, normalizing the first set of attributes to a defined format, and identifying a device type associated with the currently-observed user device based on the first set of attributes. For example, the device type may be based on the OS of the currently-observed user device, or whether the device is connected to the server via a web browser or a mobile app.

The method 300 includes the server 135 determining whether the first set of attributes incudes a threshold number of attributes (at decision block 312). For example, the threshold number of attributes may be a fixed number of attributes (e.g., two attributes, three attributes, etc.). In some instances, the threshold number of attributes is based on a threshold set of attributes, such as, for example, a subset of a attributes that must be included in the first set of attributes.

In some examples, prior to decision block 312, the server 135 may also determine the threshold number of attributes. For example, the server 135 may calculate the threshold number of attributes based on an entropy (e.g., an across-device entropy and/or a within-device entropy) for each attribute included in the first set of attributes. The entropy is a measure of the width of a probability distribution of each attribute in the first set of attributes. For example, the server 135 computes a probability distribution for each attribute key included in the first set of attributes based on the values of that key stored in the database 140 with respect to the plurality of device records. In some instances, the server 135 samples a random selection of the plurality of device records in order to compute the probability distributions.

Figure 4:
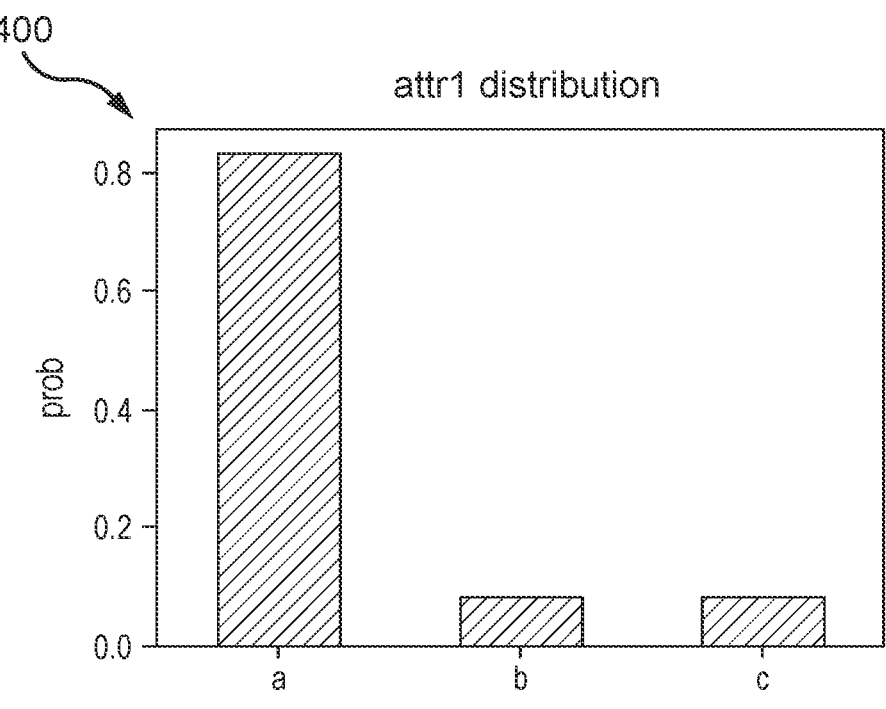
FIG. 4 illustrates a first example probability distribution for a first attribute, according to some embodiments described herein.

FIG. 4 illustrates a first example across-device probability distribution 400 for a first attribute attr1. As an example, the probability distribution 400 for the first attribute attr1 may be based on the corresponding values of the first attribute attr1 for twelve device records (e.g., twelve different previously-observed user devices).

In the illustrated example, the server 135 identifies three different values (e.g., 'a', 'b', and 'c') that are historically associated with the first attribute attr1, that ten device records include attribute value 'a' associated with the first attribute attr1, that one device record includes attribute value 'b' associated with the first attribute attr1, and that one device record includes attribute value 'c' associated with the first attribute attr1. The server 135 then calculates that the base-2 across-device entropy for the first attribute attr1 is 0.82.

Figure 5:
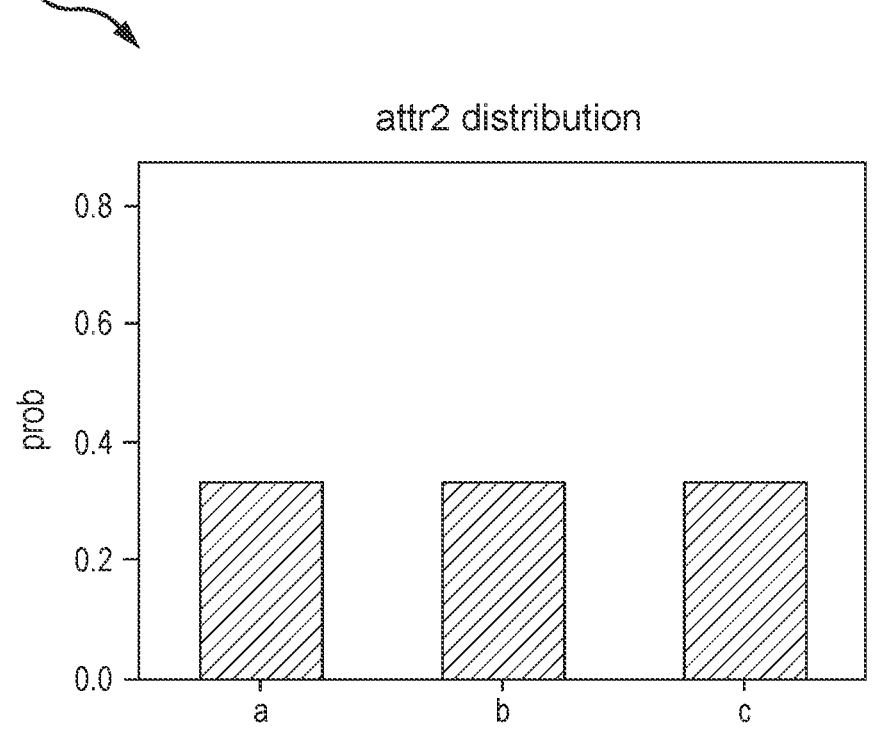
FIG. 5 illustrates a second example probability distribution for a second attribute, according to some embodiments described herein.

FIG. 5 illustrates a second example across-device probability distribution 500 for a second attribute attr2. As an example, the probability distribution 500 for the second attribute attr2 may be based on the corresponding values of the second attribute attr2 for twelve device records (e.g., twelve different previously-observed user devices).

In the illustrated example, the server 135 identifies three different values (e.g., 'a', 'b', and 'c') that are historically associated with the second attribute attr2, that four device records include attribute value 'a' associated with the second attribute attr2, that four device records include attribute value 'b' associated with the second attribute attr2, and that four device records include attribute value 'c' associated with the second attribute attr2. The server 135 then calculates that the base-2 across-device entropy for the second attribute attr2 is 1.59.

In view of FIGS. 4 and 5, the second attribute attr2 has a higher across-device entropy than that of the first attribute attr1. Therefore, the second attribute attr2 provides more valuable information to the server 135 for the purpose of identifying the currently-observed user device compared to the first attribute attr1. The server 135 may compute the threshold number of attributes based on a sum of the across-device entropies for the first set of attributes, or compute a threshold set of attributes based on the attributes having the highest across-device entropies.

In some instances, the server 135 computes the within-device device entropy for each attribute included in the first set of attributes alternative or in addition to the across-device entropy. The within-device entropy is an indicator of how stable the values for a particular attribute are for a single device over time. An attribute having a low within-device entropy enables the server 135 to track a particular device over a longer period of time than an attribute having a high within-device entropy, which is more likely subject to change.

Referring again to FIG. 3, when the server 135 determines that the first set of attributes does not include the threshold number of device attributes ("NO" at decision block 312), the server 135 generates and assigns a default UDID for the device (at block 316). In such instances, the server 135 may not store a device record having the default UDID or the first set of attributes in the database 140.

In contrast, when the server 135 determines that the first set of attributes includes a threshold number of device attributes ("YES" at decision block 312), the server 135 computes an attribute hash for the first set of attributes (at block 320). The attribute hash is a unique identifier, or signature, that the server 135 computes based on some or the available attributes in the first set of attributes. In some instances, server 135 computes the attribute hash based on all available attributes in the first set of attributes. In some instance, the server 135 computes the attribute hash based on all available attributes in the first set of attributes except for timestamp metadata.

The method 300 includes the server 135 determining whether the database 140 includes a device record with a record ID equal to the attribute hash (at decision block 324). The server 135 uses the attribute hash as a computational shortcut to identify a device record, and therefore a UDID, associated with a previously-observed user device that is the same as the currently-observed user device (e.g., in a case where no attributes have changed since the currently-observed user device was previously observed). For each UDID stored in the database 140, there is exactly one device record associated with the UDID, and therefore exactly one record ID.

When the server 135 determines that the database 140 includes a particular device record having a record ID equal to the attribute hash of the first set of attributes ("YES" at decision block 324), the server 135 updates a timestamp associated with the particular device record (at block 328). The method 300 includes returning the UDID associated with the particular device record as the IP hardened UDID to be assigned to the user device (at block 332).

When the server 135 determines that the database 140 does not include a device record having a record ID equal to the attribute hash for the first set of attributes ("NO" at decision block 324), the server 135 generates a query based on the first set of attributes (at block 336). The server 135 may generate the query using some or all of the first set of attributes. The server 135 uses the query to search one of the plurality of indexes based on the identified device type of the currently-observed user device. The query returns a set of candidate device record results. Each candidate device record includes a candidate set of attributes.

The query may include a set of strict filters. The strict filters are attributes for which the corresponding attribute values in a candidate device record must match the corresponding attribute values in the first set of attributes in order for the candidate device record to be included in the results. The strict filters generally indicate device attributes which are not likely to change over time for an individual device. For example, the strict filters may include at least one selected from the group consisting of a device model, a screen resolution, an OS family, a color depth, or and a platform. The query therefore returns a set of candidate device records, wherein each device record included in the set of candidate device records includes attributes satisfying the strict filters. In some instances, such as when there are no device records in the searched partition that have attributes satisfying the strict filters, the query does not return any results (e.g., the set of candidate device records is an empty set).

The method 300 includes the server 135 determining whether the query returns any device record results (at decision block 340). When the query does not return any device record results ("NO" at decision block 340), the server 135 generates a new device record with a new UDID (at block 344). The new device record includes, as the set of device record attributes, the first set of attributes. The new device record also includes a timestamp. The server 135 adds the new device record to the database 140 (at block 348), and returns the new UDID as the IP hardened UDID to be assigned to the user device (at block 332).

In contrast, when the query returns at least one device record candidate ("YES" at decision block 340), the server 135 selects a best match device record from the device record candidates included in the query results (at block 352). In some instances, the server 135 selects the best match device record by identifying a matching set of attributes for each candidate device record. For each candidate device record, the server 135 computes the matching set of attributes based on the attribute key-value pairs included in the first set of attributes that match attribute key-value pairs included in the candidate set of attributes. It is not necessary that all of attributes in the first set of attributes match all of the attributes in the candidate set of attributes. Similarly, it is not necessary that all of the attribute keys included in the first set of attributes be included in the candidate set of attributes. In this manner, the server 135 compensates for a change in attribute values for a device over time, and compensates for an absence of certain attributes (e.g., an absence of an IP address attribute).

The server 135 computes a total relevance score for each candidate device record (e.g., for each matching set of attributes). The server 135 computes the total relevance score by computing an individual relevance score for each attribute key included in the matching set of attributes. The individual relevance scores are an indication of the uniqueness of each attribute. For example, the server 135 may compute the individual relevance score for an attribute based on the entropy (e.g., the across-device entropy and/or the within-device entropy) of that attribute. Alternatively or in addition, the server 135 computes the relevance score for an attribute based on a rarity of the attribute value. For example, the server 135 may compute a higher relevance score for a language attribute having a value representative of Canadian French than a language attribute having a value representative of American English.

Figure 6:
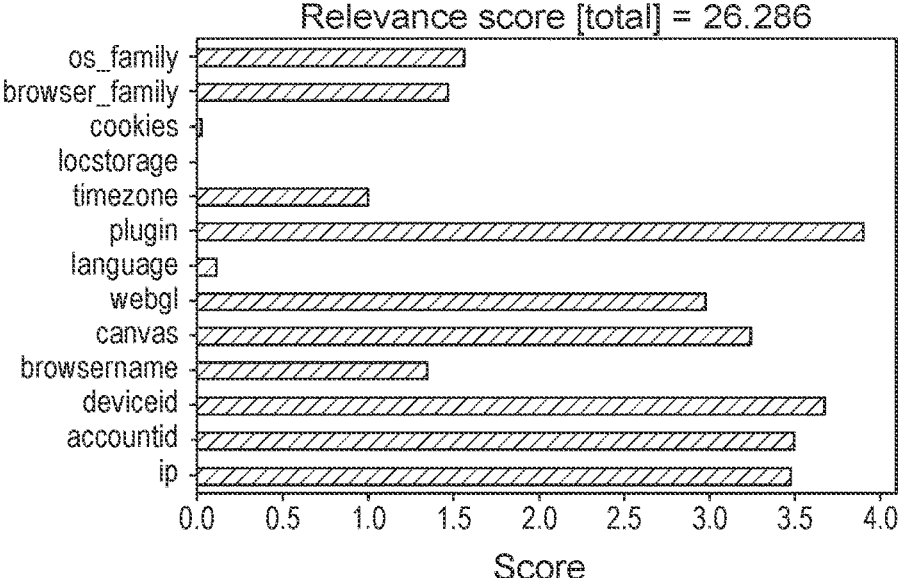
FIG. 6 illustrates a first example relevance score for a set of attributes, according to some embodiments described herein.
Figure 7:
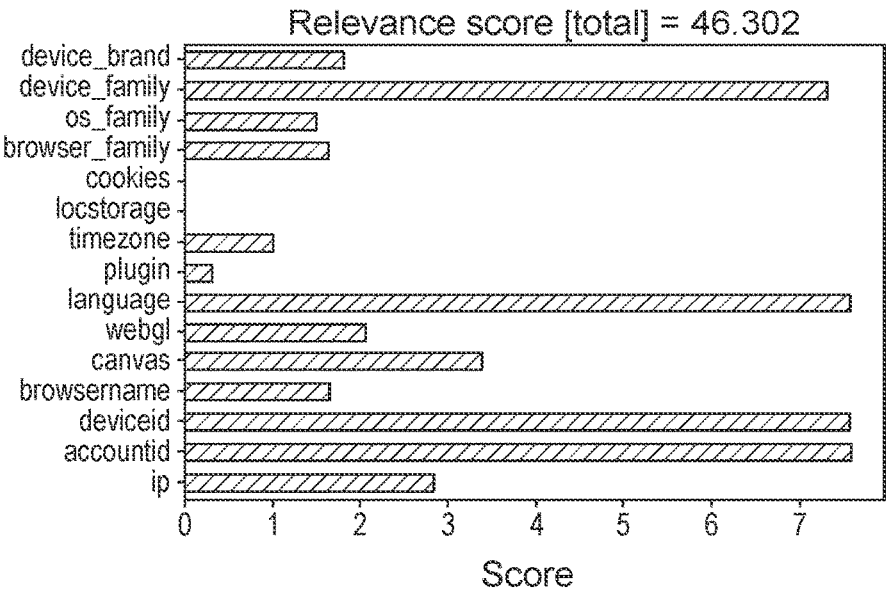
FIG. 7 is a second example relevance score for a set of attributes, according to some embodiments described herein.

FIGS. 6 and 7 illustrate respective first and second example relevance scores 600 and 700 for device attributes. As illustrated in FIGS. 6 and 7, the attributes included in the matching set of attributes may vary, and the relevance score associated with each attribute in the matching set of attributes may vary. The server 135 may select the candidate device record having the highest total relevance score as the best match device record.

Referring again to FIG. 3, the method 300 includes the server 135 determining whether the total relevance score of the best match device record exceeds a relevance threshold (at decision block 356). The relevance threshold is an indicator of whether a previously-observed device is the same as the currently-observed device. The server 135 may compute the relevance threshold based on the total relevance score, or according to another suitable scheme. In some instances, the server 135 computes the relevance threshold based on the device type. In some instances, the server 135 computes the relevance threshold based on the number of device records included in the plurality of device records for a particular index. In some instances, the server 135 computes the relevance threshold based on the attributes included in the matching set of attributes or based on the attributes included in the first set of attributes.

When the server 135 determines that relevance score of the best match device record does not exceed the relevance threshold ("NO" at decision block 356), the server 135 generates a new device record with a new UDID (at block 344). The new device record includes, as the set of device record attributes, the first set of attributes. The new device record also includes a timestamp. The server 135 adds the new device record to the database 140 (at block 348), and returns the new UDID as the IP hardened UDID to be assigned to the user device (at block 332).

In contrast, when the server 135 determines that relevance score of the best match device record does exceed the relevance threshold ("YES" at decision block 356), the server 135 updates a timestamp associated with the best match device record, and updates the set of attributes associated with the best match device record to be the first set of attributes. For example, the server 135 updates the attributes associated with the best match device record which are not included in the matching set of attributes.

In some instances, the server 135 stores, in the database 140, a history of each device record included in the plurality of device records. For example, the server 135 stores a log of which attributes have changed over time for each device record. In this manner, the server 135 may compute the within-device entropy for each device record in the database 140.

After updating the best match device record in the database 140, the server 135 returns the UDID associated with the best match device record as the IP hardened UDID to be assigned to the user device (at block 332).

Figure 8:
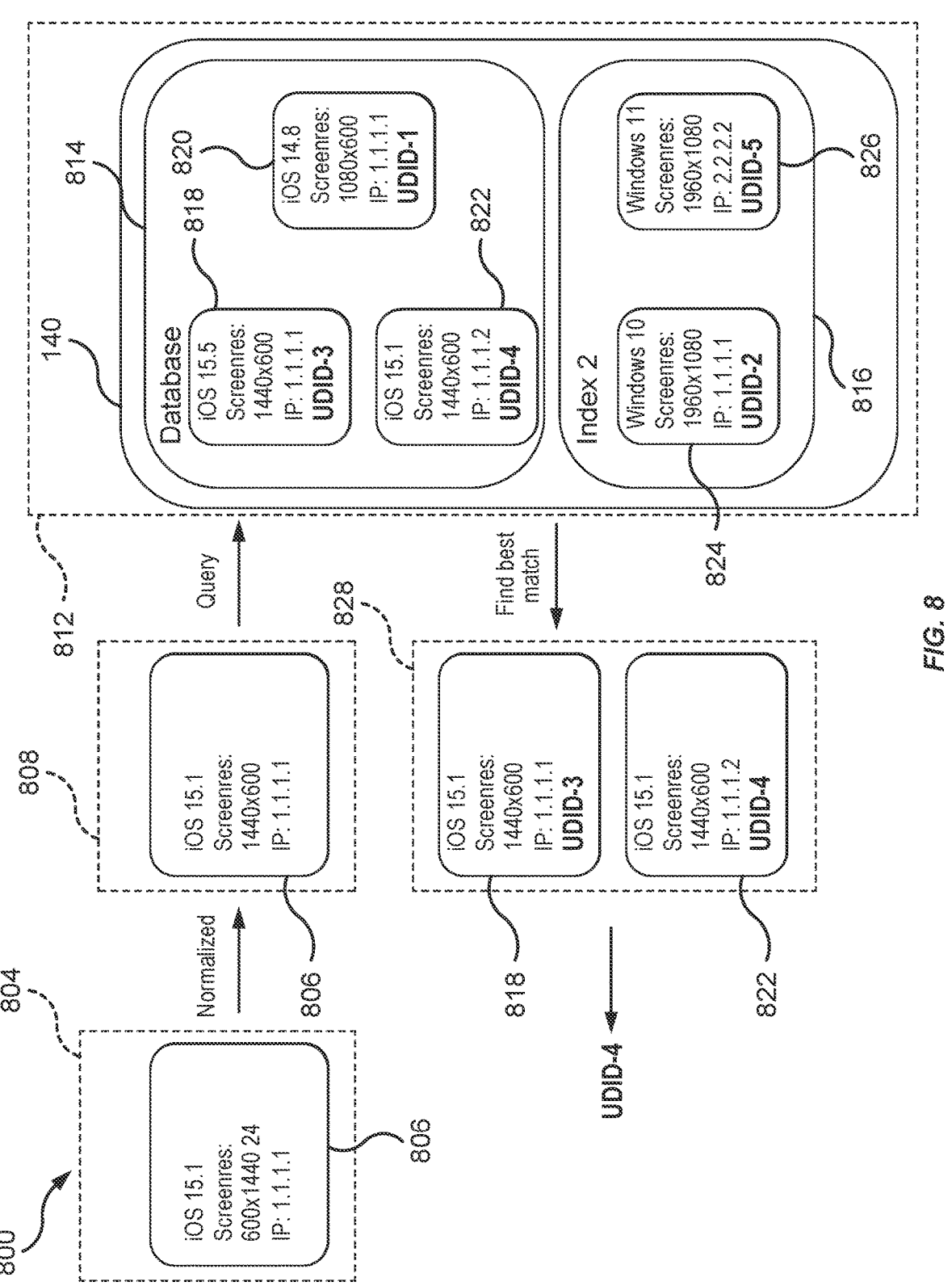
FIG. 8 illustrates a second example method for generating a Universal Device Identifier for a user device, according to some embodiments described herein.

FIG. 8 is a flowchart that illustrates a second example method 800 executed by the server 135 for generating an IP hardened UDID for a currently-observed user device, according to some embodiments. The method 800 is described with respect to the server 135 of FIGS. 1 and 2.

The method 800 includes the server 135 receiving a request to identify a currently-observed device (at block 804). The request includes a first set of attributes 806 associated with the currently-observed user device. In the illustrated example, the first set of attributes 806 includes an operating system version attribute having a value of '15.1', a screen resolution attribute having a value of '600×1440 24', and an IP address attribute having a value of '1.1.1.1'.

The method 800 includes the server 135 normalizing the first set of attributes 806. In some instances, the server 135 normalizes the first set of attributes 806 by changing a format of the first set of attributes 806 (at block 808). For example, the server 135 formats the screen resolution attribute to have a value of '1440×600'. In some instances, normalizing the first set of attributes 806 includes identifying a device type of the currently-observed user device based on the first set of attributes 806.

The method 800 includes the server 135 generating a query based on the first set of attributes 806 and searching one of a plurality of indexes included in the database 140 (at block 812). In the illustrated example, the database 140 includes a first index 814 associated with a first device type (e.g., an iOS device) and a second index 816 associated with a second device type (e.g., a Windows device). The first index 814 includes a first plurality of device records associated with previously-observed user devices of the first device type, and the second index 816 includes a second plurality of device records associated with previously observed devices of the second device type. In the illustrated example, the first index 814 includes a first device record 818 having a first UDID (UDID-3), a second device record 820 having a second UDID (UDID-2), and a third device record 822 having a third UDID (UDID-3). The second index 816 includes a fourth device record 824 having a fourth UDID (UDID-4) and a fifth device record 826 having a fifth UDID (UDID-5). Each of the first plurality of device records and each of the second plurality of device records includes a set of device record attributes. The server 135 searches, using the query, the index associated with the device type of the currently-observed user device. In the illustrated example, the server 135 searches the first index 814.

The method 800 includes the server 135 selecting a best match device record from the first plurality of device records (at block 828). The server 135 selects the best match device record by selecting a set of candidate device records 830. The server 135 selects the device records included in the set of candidate device records 830 based on a weighted comparison of the first set of attributes and the set of device record attributes associated with each device record in the first index 814. In the illustrated example, the set of candidate device records 830 includes the first device record 818 and the third device record 822. The server 135 selects a device record included in the set of candidate device records 830 as the best match device record. For example, the server 135 computes that an IP address attribute is more likely to change than an operating system version attribute, and therefore selects the third device record 822 as the best match device record. The server 135 assigns the fourth UDID (UDID-4) to the currently-observed user device.

It is to be understood that the embodiments are not limited in its application to the details of the configuration and arrangement of components set forth herein or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more electronic processors, such as a microprocessor and/or application specific integrated circuits ("ASICs"). As such, it should be noted that a plurality of hardware and software based devices, as well as a plurality of different structural components, may be utilized to implement the embodiments. For example, "servers" and "computing devices" described in the specification can include one or more electronic processors, one or more computer-readable medium modules, one or more input/output interfaces, and various connections (e.g., a system bus) connecting the various components.

Thus, embodiments described herein provide, among other things, universal device identifier (UDID) service that uses device attributes to assign a UDID to a user device. Various features and advantages are set forth in the following claims.

What is claimed is:

1. A server comprising:
   a memory including a UDID database; and
   an electronic processor configured to:
   receive an identification request regarding a currently-observed user device having a first set of attributes associated with the currently-observed user device, the first set of attributes including an IP address of the currently-observed user device,
   generate an IP hardened UDID associated with the currently-observed user device based on the first set of attributes, and
   store the IP hardened UDID in the UDID database,
   wherein the IP hardened UDID compensates for changes in the IP address of the currently-observed user device over a period of time.

2. The server of claim 1, wherein
   the UDID database stores a plurality of device records,
   each respective device record of the plurality of device records is associated with a previously-observed user device,
   the each respective device record includes a second set of attributes and a UDID associated with the each respective device record, and the electronic processor is configured to generate the IP hardened UDID by selecting a set of candidate device records from the plurality of device records based on the first set of attributes.

3. The server of claim 2, wherein the electronic processor is further configured to generate the IP hardened UDID by determining whether the set of candidate device records includes at least one device record, in response to determining that the set of candidate device records includes the at least one device record, selecting one of the at least one device record included in the set of candidate device records, determining whether a total relevance score associated with the selected one of the at least one device record exceeds a threshold score, in response to determining that the total relevance score associated with the selected one of the at least one device record exceeds the threshold score, selecting the UDID associated with the selected one of the at least one device record as the IP hardened UDID, and returning the UDID associated with the selected one of the at least one device record as a response to the identification request.

4. The server of claim 3, wherein the electronic processor is configured to select one of the at least one device record included in the set of candidate device records by computing the total relevance score for the each respective device record included in the set of candidate device records, and selecting a device record from the set of candidate device records having a highest total relevance score.

5. The server of claim 4, wherein the electronic processor is configured to compute the total relevance score for the each respective device record included in the set of candidate device records by for each attribute included in the second set of attributes of the each respective device record that is equal to an attribute included in the first set of attributes, computing an individual relevance score, and computing a sum of each individual relevance score for the each respective device record.

6. The server of claim 5, wherein the electronic processor is configured to compute the individual relevance score based on at least one selected from a group consisting of:

a key of the attribute, a term of the attribute, an entropy of the attribute, and a rarity of the attribute.

7. The server of claim 3, wherein the electronic processor is further configured to modify, in the UDID database, the second set of attributes included in the selected one of the at least one device record based on the first set of attributes.

8. The server of claim 3, wherein the electronic processor is further configured to generate the IP hardened UDID by in response to determining that the total relevance score associated with the selected one of the at least one device record does not exceed the threshold score, generating a new device record including the first set of attributes, generating a new UDID associated with the new device record as the IP hardened UDID, and storing the new device record in the UDID database.

9. The server of claim 2, wherein the electronic processor is further configured to generate the IP hardened UDID by determining whether the set of candidate device records includes at least one device record, in response to determining that the set of candidate device records does not include the at least one device record, generating a new device record including the first set of attributes, generating a new UDID associated with the new device record as the IP hardened UDID, storing the new device record in the UDID database, and returning the new UDID associated with the new device record as a response to the identification request.

10. A method for UDID generation, the method comprising:

receiving, with an electronic processor, an identification request regarding a currently-observed user device having a first set of attributes associated with the currently-observed user device, the first set of attributes including an IP address of the currently-observed user device;

generating, with the electronic processor, an IP hardened UDID associated with the currently-observed user device based on the first set of attributes; and storing, with the electronic processor, the IP hardened UDID in a UDID database, wherein the IP hardened UDID compensates for at least one selected from a group consisting of:

changes in the IP address of the currently-observed user device over a period of time, and an absence of the IP address in the first set of attributes.

11. The method of claim 10, wherein the UDID database stores a plurality of device records, each respective device record of the plurality of device records is associated with a previously-observed user device, the each respective device record includes a second set of attributes and a UDID associated with the each respective device record, and generating the IP hardened UDID includes selecting a set of candidate device records from the plurality of device records based on the first set of attributes.

12. The method of claim 11, wherein generating the IP hardened UDID includes determining whether the set of candidate device records includes at least one device record, in response to determining that the set of candidate device records includes the at least one device record, selecting one of the at least one device record included in the set of candidate device records, determining whether a total relevance score associated with the selected one of the at least one device record exceeds a threshold score, in response to determining that the total relevance score associated with the selected one of the at least one device record exceeds the threshold score, selecting the UDID associated with the selected one of the at least one device record as the IP hardened UDID, and returning the UDID associated with the selected one of the at least one device record as a response to the identification request.

13. The method of claim 12, wherein selecting one of the at least one device record included in the set of candidate device records includes computing the total relevance score for the each respective device record included in the set of candidate device records, and selecting a device record from the set of candidate device records having a highest total relevance score.

14. The method of claim 13, wherein computing the total relevance score for the each respective device record included in the set of candidate device records includes for each attribute included in the second set of attributes of the each respective device record that is equal to an attribute included in the first set of attributes, computing an individual relevance score, and computing a sum of each individual relevance score for the each respective device record.

15. The method of claim 14, wherein the individual relevance score is computed based on at least one selected from a group consisting of:

a key of the attribute, a term of the attribute, an entropy of the attribute, and a rarity of the attribute.

16. The method of claim 12, further comprising modifying, in the UDID database with the electronic processor, the second set of attributes included in the selected one of the at least one device record based on the first set of attributes.

17. The method of claim 12, wherein generating the IP hardened UDID includes in response to determining that the total relevance score associated with the selected one of the at least one device record does not exceed the threshold score, generating a new device record including the first set of attributes, generating a new UDID associated with the new device record as the IP hardened UDID, and storing the new device record in the UDID database.

18. The method of claim 11, wherein generating the IP hardened UDID includes determining whether the set of candidate device records includes at least one device record, in response to determining that the set of candidate device records does not include the at least one device record, generating a new device record including the first set of attributes, generating a new UDID associated with the new device record as the IP hardened UDID, storing the new device record in the UDID database, and returning the new UDID associated with the new device record as a response to the identification request.

19. A server comprising:

a memory including a UDID database; and an electronic processor configured to:

receive an identification request regarding a currently-observed user device having a first set of attributes associated with the currently-observed user device, the first set of attributes does not include an IP address, generate an IP hardened UDID associated with the currently-observed user device based on the first set of attributes, and store the IP hardened UDID in the UDID database, wherein the generation of the IP hardened UDID compensates for an absence of the IP address in the first set of attributes.

20. The server of claim 19, wherein the UDID database stores a plurality of device records, each respective device record of the plurality of device records is associated with a previously-observed user device, the each respective device record includes a second set of attributes and a UDID associated with the each respective device record, and the electronic processor is configured to generate the IP hardened UDID by selecting a set of candidate device records from the plurality of device records based on the first set of attributes.

* * * * *